United States Patent
Sprague et al.

(10) Patent No.: US 12,282,960 B2
(45) Date of Patent: *Apr. 22, 2025

(54) COMPRESSION OF AN EXCHANGE TRADED DERIVATIVE PORTFOLIO

(71) Applicant: Chicago Mercantile Exchange Inc., Chicago, IL (US)

(72) Inventors: Suzanne Sprague, Chicago, IL (US); Sean Downey, Chicago, IL (US); Robert Taylor, Chicago, IL (US); Dhiraj Bawadhankar, Naperville, IL (US); Stephen Hurst, Chicago, IL (US); Matthew Simpson, Wheaton, IL (US); Frederick Sturm, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,545

(22) Filed: Oct. 13, 2023

(65) Prior Publication Data

US 2024/0135449 A1  Apr. 25, 2024
US 2024/0233016 A9  Jul. 11, 2024

Related U.S. Application Data

(63) Continuation of application No. 18/106,719, filed on Feb. 7, 2023, now Pat. No. 11,861,710, which is a (Continued)

(51) Int. Cl.
G06Q 40/04 (2012.01)
G06F 7/08 (2006.01)

(52) U.S. Cl.
CPC ............... *G06Q 40/04* (2013.01); *G06F 7/08* (2013.01)

(58) Field of Classification Search
None
See application file for complete search history.

(56) References Cited

U.S. PATENT DOCUMENTS 6,038,552 A   3/2000 Fleischl
7,593,877 B2  9/2009 Glinberg
(Continued)

OTHER PUBLICATIONS

"Eric Budish, Peter Cramton, and Jon Shim, The High Frequency Trading Arms Race, Quarterly Journal of Economics, Nov. 2015" (Year: 2015).*

(Continued)

*Primary Examiner* — Christopher Bridges
*Assistant Examiner* — Toan Duc Bui
(74) *Attorney, Agent, or Firm* — Lempia Summerfield Katz LLC

(57) ABSTRACT

An illustrative computing device may include a processor and a non-transitory memory device for storing a data structure capable of being compressed, where the data structure includes a plurality of data elements and each of the plurality of data elements includes a date field and a quantity field. The computing device may process instructions to arrange the plurality of data elements in a consecutive series in date order based on a value stored in the date field of each data element, determine whether a gap appears in the consecutive series of data elements based on a value stored in the quantity field of each element, remove the determined gaps in each of the data elements, and repeat the determining and removing steps until a predetermined criterion has been reached.

20 Claims, 5 Drawing Sheets

Related U.S. Application Data continuation of application No. 17/574,061, filed on Jan. 12, 2022, now Pat. No. 11,605,130, which is a continuation of application No. 15/296,702, filed on Oct. 18, 2016, now Pat. No. 11,270,377.

(60) Provisional application No. 62/318,177, filed on Apr. 4, 2016, provisional application No. 62/317,235, filed on Apr. 1, 2016.

(56) References Cited

U.S. PATENT DOCUMENTS

| | | | | |
|---|---|---|---|---|
| 7,870,060 | B2* | 1/2011 | Barker | G06Q 40/08 705/37 |
| 7,873,564 | B1 | 1/2011 | Stevens et al. | |
| 8,190,503 | B2 | 5/2012 | Green et al. | |
| 8,494,953 | B1* | 7/2013 | Boberski | G06Q 40/04 705/37 |
| 8,639,601 | B2 | 1/2014 | Mueller | |
| 8,751,372 | B1* | 6/2014 | Friedman | G06Q 40/04 705/37 |
| 2005/0187855 | A1* | 8/2005 | Brennan | G06Q 40/06 705/37 |
| 2005/0240527 | A1 | 10/2005 | Goldman | |
| 2006/0059064 | A1 | 3/2006 | Glinberg | |
| 2007/0192221 | A1* | 8/2007 | Sandor | G06Q 40/00 705/35 |
| 2007/0244788 | A1* | 10/2007 | Ferris | G06Q 40/06 705/36 R |
| 2008/0114702 | A1 | 5/2008 | Hawrysz | |
| 2009/0037345 | A1 | 2/2009 | Barker | |
| 2009/0043663 | A1 | 2/2009 | Prater | |
| 2009/0132408 | A1 | 5/2009 | Stevens et al. | |
| 2009/0210338 | A1 | 8/2009 | Hor | |
| 2011/0004568 | A1 | 1/2011 | Phillips et al. | |
| 2012/0078772 | A1 | 3/2012 | Booth | |
| 2014/0258072 | A1 | 9/2014 | Mayor et al. | |
| 2015/0347024 | A1* | 12/2015 | Abali | G06F 3/0653 711/156 |
| 2015/0379643 | A1* | 12/2015 | Boberski | G06Q 40/06 705/36 R |
| 2016/0224600 | A1* | 8/2016 | Munk | G06Q 20/08 |

OTHER PUBLICATIONS

"Feasibility study on approaches to aggregate OTC derivates data, FSB, 2014" (Year: 2014).*

"Nichole Framularo, OTC Commodity Derivatives Trade Processing Lifecycle Events, ISDA, 2012" (Year: 2012).*

"Banks Hike OTC Compression", Markets Media, Aug. 29, 2014, http://marketsmedia.com/banks-hike-otc-compression, 4 pages.

"Barclays Capital Introduces New Electronic Swap Portfolio Compression Tool", Banking Business Review, Aug. 10, 2010, http://bankingtechnology.banking-business-review.com/news/barclays_capital_introduces_new_electronic_swap_portfolio_compression_tool_100810, 2 pages.

"Confirmation, Portfolio Reconciliation, Portfolio Compression, and Swap Trading Relationship Documentation Requirements for Swap Dealers and Major Swap Participants", Commodity Futures Trading Commission, Office of Public Affairs, available as early as Oct. 18, 2016, 4 pages.

"Interest Rate Swaps Compression: A Progress Report", ISDA Study, Feb. 2012, 9 pages.

"The Future of Computer Trading in Financial Markets, Final Project Report", The Government Office for Science, London, 2012, 184 pages.

"Wall Street's Tear-Ups of Swaps Accelerating-Market Talk", Market Talk—iMarket Reports, Jul. 15, 2014, http://marketreports.com/wall-streets-tear-ups-of-swaps-accelerating-market-talk.html, 5 pages.

Amir Khwaja, "Swaps Compression and Compaction on TrueEX and Tradeweb SEFs", TabbForum, Jul. 25, 2014, http://tabbforum.com/opinions/swaps-compression-and-compaction-on-trueex-and-tradeweb-sefs.

Beth Shah, "LCH Launches Blended Compression for Rates", GlobalCapital, Sep. 17, 2014, 2 pages.

Howard Mason, "Barclays: Swaps Compression/Central Clearing will Reduce the Balance Sheet Beyond Expectations", Nov. 10, 2013, 2 pages, http://www.sector-sovereign.com/2013/11/barclays-swaps-compressioncentral-clearing-will-reduce-the-balance-sheetbeyond-expectations.

ICAP, Barclays Capital—Global Financial Services Conference, Sep. 2011, 18 pages.

Markus K. Brunnermeier, Lecture 10: Multi Period Model Futures & Swap, Princeton University, 2016 (Year: 2016).

Renee Caruthers, "Buy Side Turns to Compression and Compaction", FierceFinanceIT, Aug. 28, 2014, 3 pages.

Trioptima, Portfolio Compression, UK Power Trading Forum, Sep. 19, 2013, 19 pages.

* cited by examiner

Algorithm 2

| Original Total Open Interest |
|---|
| 4150 |

| New Total Open Interest |
|---|
| 300 |

The Blue line represents the maximum outstanding open interest. The algorithm identifies this amount, and then replaces the existing open interest with a contract that includes a 'maximum outstanding open interest' that is paired with a fraction schedule across the months of open interest. This process is akin to creating a variable notional swap, whereby there is a single maximum notional reference amount (which is used to derive regulatory capital requirements) and then fractions attributable to each individual month for which the contract exists.

Figure 4

The Blue line represents an optimization opportunity. In this case the existing open interest is akin to a common "calendar spread" trading strategy. Our algorithm will take the calendar spread and reduce it into a single new position that represents the identical risk, but without the burdensome double count of gross notional outstanding. This will provide the clearing firms capital and operational efficiencies by allowing them to represent the positions as single set of risk exposures.

| Original Total Open Interest |
|---|
| 8,110 |

| New Total Open Interest |
|---|
| 4,750 |

Algorithm 3

| | | Mar-16 | Jun-16 | Sep-16 | Dec-16 | Mar-17 | Jun-17 |
|---|---|---|---|---|---|---|---|
| Initial Open Interest | Long | 120 | 1,500 | 800 | 900 | 500 | 800 |
| | Short | 1,100 | 660 | 700 | 300 | 600 | 130 |
| | Total | 1,220 | 2,160 | 1,500 | 1,200 | 1,100 | 930 |
| Optimization Cycle 1 | | - | 1,500 | 860 | 900 | 500 | 860 |
| | | | 0.694 | 0.573 | 0.750 | 0.455 | 0.860 |
| Final Open Interest | | 120 | 1,500 | 860 | 900 | 500 | 930 |

Figure 5

COMPRESSION OF AN EXCHANGE TRADED DERIVATIVE PORTFOLIO

REFERENCE TO RELATED APPLICATIONS

This application is a continuation under 37 C.F.R. § 1.53 (b) of U.S. patent application Ser. No. 18/106,719 filed Feb. 7, 2023 now U.S. Pat. No. 11,861,710, which is a continuation under 37 C.F.R. § 1.53 (b) of U.S. patent application Ser. No. 17/574,061 filed Jan. 12, 2022 now U.S. Pat. No. 11,605,130, which is a continuation under 37 C.F.R. § 1.53 (b) of U.S. patent application Ser. No. 15/296,702 filed Oct. 18, 2016 now U.S. Pat. No. 11,270,377, which claims the benefit of the filing date under 35 U.S.C. § 119 (e) U.S. Provisional Patent Application Ser. No. 62/317,235, filed Apr. 1, 2016 and U.S. Provisional Patent Application Ser. No. 62/318,177, filed Apr. 4, 2016, the entire disclosures of which are hereby incorporated by reference.

BACKGROUND

Over-the-counter (OTC) and Exchange traded products include financial instruments that are bought, sold, traded, exchanged, and/or swapped between counterparties. Many exchange traded and/or OTC derivatives exist to fill a wide range of needs for counterparties, including limiting or mitigating exposure to risks and/or maximizing cash flow. After an exchange of an exchange traded or OTC product, counterparties may expend resources managing the product until the contract matures. Management may be complicated based on the number of exchanges and/or the specific terms of the transaction.

In many cases, regulatory capital requirements for clearing firms' and/or their clients' derivatives positions may be largely based on gross notional outstanding, which is a construct that results from regulators crafting their regulation mainly based upon bi-lateral Over-The-Counter swaps. However, when applying this process within the exchange-traded derivatives space, the construct may result in a less than accurate and efficient representation of a clearing firm's exposure, from an operational and capital perspective. As such, a need has been recognized for optimizing the existing exchange traded derivatives open interest into new contracts that appropriately represent clearing firm risk.

SUMMARY OF THE INVENTION

The disclosure corresponds to a clearing and reporting system for reducing the gross notional amount outstanding of positions within a portfolio of existing exchange traded derivatives contracts. The system simplifies back office processing for clearing firms by creating a more efficient process for the representation and calculation of their derivatives positions capital requirements. Additionally, this more efficient process may reduce memory storage requirements and make more efficient use of existing computing systems when processing multiple portfolios. The reduction in gross notional outstanding may be accomplished through various "compression" algorithms that create a new amount of derivatives products which represents a portfolio of multiple derivatives contracts. This new derivatives product may allow for a reduction in memory and data storage requirements and allow for more efficient use of the processing power installed at the clearinghouse.

The system will allow the original portfolio of exchange traded derivatives products to be represented in a manner akin to the bi-lateral OTC derivatives markets which are the basis for most regulatory capital requirements. The systems and methods discussed herein will also reduce the operational overhead for firms by utilizing this process in conjunction with existing processes. Initial use of this service will be in relation to computing systems associated with futures exchange traded products and may be extended to areas where many different product exposures can be represented by more efficient replacement products. For example, this service may be used with options on futures products, options contracts including "vanilla" stock options, and the like. In some cases, the options may include one or more types of options including American-style options, European-style options, exchange traded options, OTC options, stock options, index options, forex options, currency options, futures options, commodity options, basket options, and the like. In some cases, this service may be used with one or more types of options classified by expiration, such as regular options, weekly options, quarterly options, long-term expiration anticipation securities (LEAPS), and the like. In some cases, the service may be used with one or more types of options that may be classified as "exotic" options, such as barrier options, binary options, chooser options, compound options, look back options, and/or the like.

A financial institution associated with a portfolio holding a plurality of exchange traded derivatives may have one or more computing systems (e.g., servers, data repositories, processors, etc.) that may be used, at least in part, to store or otherwise manage portfolios of the financial institution's clients. These financial institution computing systems may be sized to manage a specified amount of data associated with aspects of the financial institution's business. This may include managing and/or processing information associated with the portfolios. As portfolios become larger for one or more of the financial institution's clients, the data storage capacity and/or processing power necessary to process and/or store this information may approach a storage capacity and/or processing power limit of the currently installed hardware. As such, the financial institution may be required to install more computing devices and/or upgrade existing computing components to handle the additional information storage and/or processing requirements. By monitoring, or otherwise managing the size of one or more portfolios, the financial institution may be able to proactively manage the computing requirements and the associated costs. For example, the financial institution may monitor a size of a client's portfolio. If the portfolio size approaches a threshold, the financial institution computing system may automatically initiate a portfolio compression process. In other cases, the financial institution computing system may provide an indication to an individual, such as a network manager, that the computing system is approaching the limits to allow manual initiation of a portfolio compression process. Alternatively, the computing system may store the portfolio in a compressed form for some or all clients so as to minimize the data storage and processing requirements.

The details of these and other embodiments of the present invention are set forth in the accompanying drawings and the description below. Other features and advantages of the invention will be apparent from the description and drawings.

BRIEF DESCRIPTION OF THE DRAWINGS

The present invention may take physical form in certain parts and steps, embodiments of which will be described in detail in the following description and illustrated in the accompanying drawings that form a part hereof, wherein:

FIG. 3-5 show data tables illustrative of methods for blending an exchange traded derivatives portfolio according to at least some embodiments.

DETAILED DESCRIPTION

Figure 1:
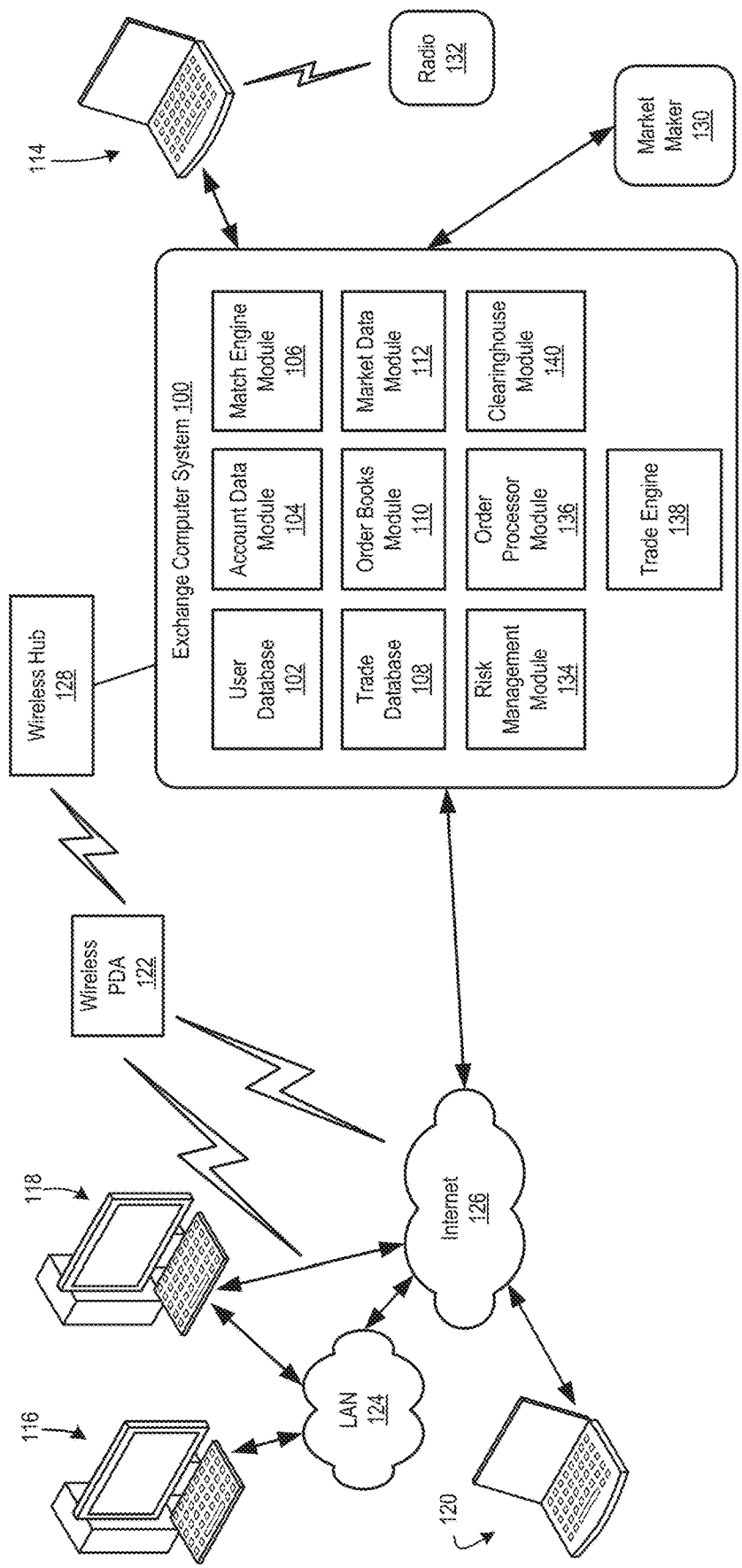
FIG. 1 shows an illustrative trading network environment for implementing trading systems and methods according to at least some embodiments.

Exchange trading organizations and/or clearing firms may maintain exchange traded derivatives positions on the books as related to individual contracts. Often these derivative positions may be stored in a database as a data structure having a structure corresponding to the contract type. Prudential regulators capital requirements is driven based on an understanding of OTC swaps, which do not distinguish from exchange traded products. As such, clearing firms may allocate more capital than is necessary to account for the risk. Further, in doing so, excess computing power may be used when determining the capital requirements, resulting in networking inefficiency and/or causing increased computing requirement costs in maintaining and upgrading servers and other network computing assets.

Current systems represent the open interest in individual contracts across all future expirations within the same product. Because regulatory capital requirements have been developed based mainly on the structure of the OTC derivatives markets, this not only results in a burdensome and inefficient amount of line items that have to be processed, but also is extremely inefficient from a capital perspective. In some cases, a natural netting of futures products on opposite sides of the market automatically compresses contracts into a reduced number of line items (e.g., a single line item, two line items, three line items, etc.) within the same contract and maturity date. Further, one or more OTC algorithms may be used compress line items within the same maturity date.

The current process that is in place does not solve for the problem completely. The natural netting of Long and Short positions that is available for exchanged traded products today will reduce the gross notional of outstanding positions to some extent. The problem is that the existing solutions do not scale across maturity dates, which are easily replicable in the OTC market with a more capital efficient lower gross notional outstanding. As such, existing methods result in significant gross notional exposure that remains outstanding for exchange traded products, creating a burdensome capital requirement for trading relative to the liquidity and tenor profile of exchange traded markets. Examples can be shown of this.

In an illustrative example, a firm may have a 1 lot position across all 40 quarterly Eurodollar contracts. Current regulatory capital requirement systems view this portfolio as 40 million in gross notional, as each contract retains its own gross notional amount of $1 million. In contrast, a 1 million bi-lateral over-the-counter 10-year interest rate swap contract has the same risk exposure as the example portfolio above, but is counted as 1 million gross notional under current regulatory capital requirements. The new disclosure addresses these problems by (1) reducing the gross notional outstanding of exchange traded derivatives; and (2) creating an operational process that reduces the technology overhead generated from reporting process, such as by reducing the amount of data and/or subsequent computing processes required to store the trades associated with one or more large portfolios.

Figure 3:
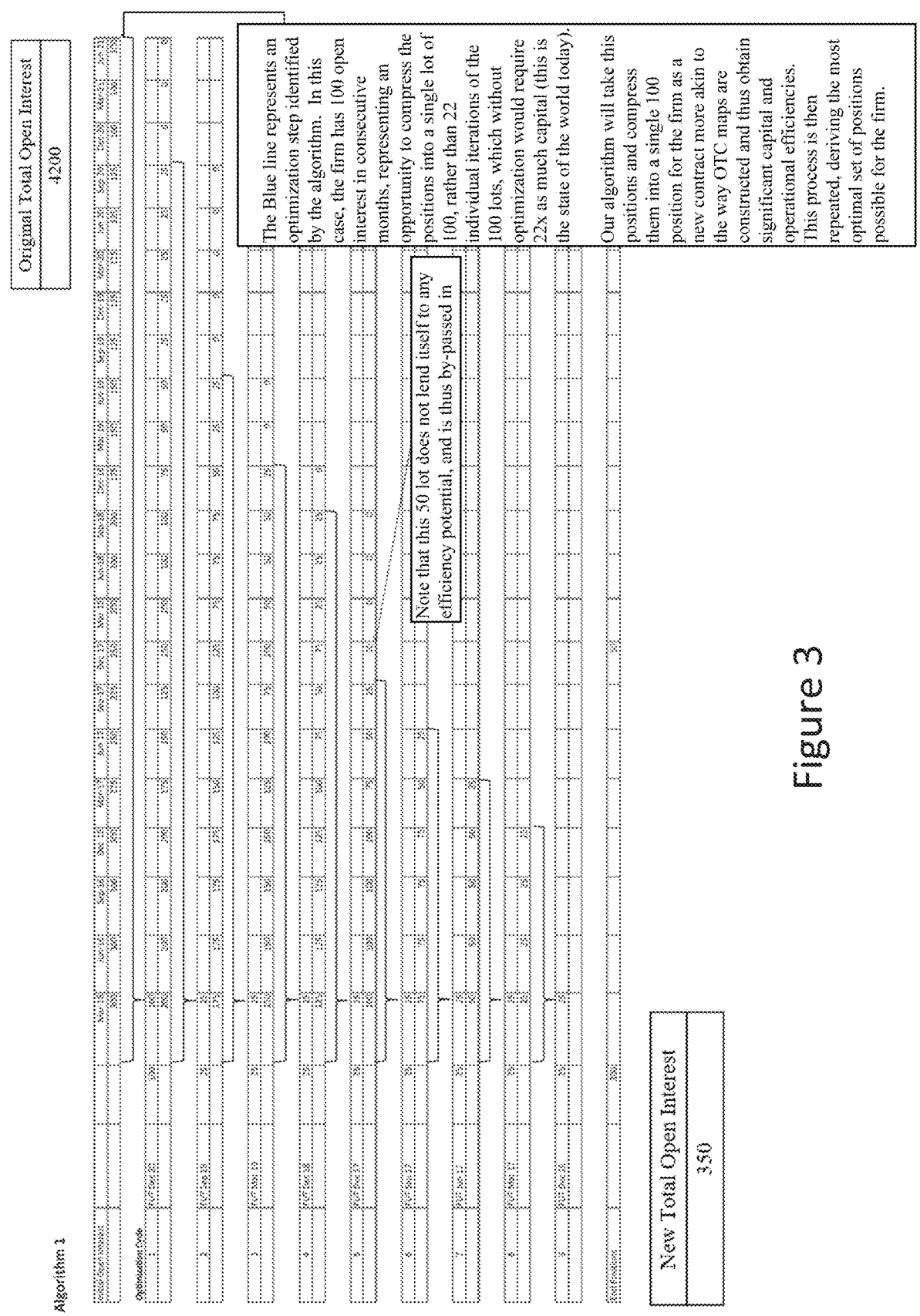

The reduction of gross notional can be achieved with the following algorithms. Within the entire pool of open interest of futures positions, positions may be identified that are present in consecutive contracts for a given product. For each common notional present in the longest series, a position may be created in a "new futures product" that represents the original series. Next, the next longest series may be identified, and a position may be created in that "new futures product". An example of which is shown in FIG. 3.

In some cases, a compression module may also be configured to perform a full compression on a portfolio to compress the portfolio into a single tradeable block that may be traded or otherwise settled like another tradeable product. In some cases, the compression module may process the algorithms to perform futures compression of line items of a portfolio into two or more tradeable "blocks". For example, a portfolio may be compressed into one or more "blocks" such that a first portion of positions may be compressed into a first block, a second portion of positions may be compressed into a second block, and the like. For example, in FIG. 3, the algorithm processed by a portfolio compression module may be used to process a portfolio in multiple iterations over an operation cycle. In some cases, the portfolio may be partitioned into a plurality of blocks where one or more of the optimization cycles may result in a block. In some cases, the grouped contracts, as shown in the grouped optimization cycle groups may be used to create a series of blocks that may be traded between two counterparties. For example, the 100 lots extending through June 2021, as generated by the first optimization cycle of the algorithm may be used as a tradeable block. In some cases, the compression module may be configured to generate a "wrapped" package of futures contracts. For example, the groups of new contracts, as shown in the results of each of the optimization cycles of FIG. 3 may be used to represent a "wrapped" set of contracts representative of a new legally binding financial contract between the clearing member, or their client, and the clearing house hosting the original exchange traded derivatives. The output may then be capitalized in a more efficient manner as a new wrapped basket of securities which retain a single gross notional amount based on the maximum outstanding notional amount at any given contract month in the underlying wrapped basket.

Within a portfolio of futures positions, a computing system may identify the contract having the largest open interest and be programmed to use the notional of that contract to create the "new futures product," as shown in the illustrative example of FIG. 4. The total open interest of the new futures product is matched to the largest open interest identified in the original portfolio. This new futures product is then paired with a fraction schedule across the months of open interest. This process is akin to creating a variable notional derivative, whereby, in some cases, there is a single maximum notional reference amount, which is used to derive regulatory capital requirements, and then fractions attributable to each individual month for which the contract exists. In some cases, a plurality of notional reference amounts may be used to derive the regulatory capital requirements, where each of the plurality of notional reference amounts may correspond to a different variable notional derivative, where fractions may also be attributable to one or more months for which the different contracts may exist. In some cases, the individual holdings may exist in a portfolio, where the calculated notional reference amount or amounts may be used as a wrapper, for which associated regulatory capital requirements may be calculated.

Within a portfolio of futures open interest, the computing system may identify and match long positions and short positions across contiguous maturities, as shown in FIG. 5. Combining these long and short notional exposures can be used to create the "new futures product" with a notional equal to the absolute value of the difference between the notional values of the contracts plus any remainder positions. By adjusting the size of the data structure utilizing the values stored in the data structures themselves, the memory requirements for storing the information may be reduced by compressing the information stored within the database that is representative of the complete portfolio, into a single data structure representative of a single new futures product.

Variations of these algorithms may reduce the gross notional outstanding of any exchange traded derivative products for both futures and options (e.g., options on futures contracts, index options, forex options, and/or other options such as those discussed above). The operational process between the clearing house and the clearing members is as follows:

(1) Run the clearing cycle without any change from current systems. The existing back office systems of clearing members will continue to capture the data needed from clearing houses (real time and end of day) as they do today.

(2) After the end of day process is completed, a product transformation process ("compression") will run one of the above algorithms and create open interest in the "new futures product(s)".

(3) The system then generates new reports that show the open interest in the new futures products. These new futures products retain the reduced gross notional that more accurately represents the risk profile of a clearing firm's positions.

(4) Once the reports are generated, the open interest may be reverted back ("decompressed") to the contracts contained in the portfolio prior to compression. In some cases, the open interest may be used to generate a new exchange-traded option corresponding to the open interest.

By conducting the process as mentioned above, we will significantly reduce the back-office processing required to achieve regulatory capital efficiency. This process also removes the need to create a new product for which liquidity needs to be built. Existing liquid contracts will be used to effectively establish the risk profile that the customers and firms want. The information created in the report corresponding to the new futures product may be stored as metadata associated with the uncompressed portfolio to provide a reference to the reduced gross notional value to improve computing efficiency when calculating risks and margining requirements. Many steps are eliminated because of this process—such as building a new set of products for trading and sourcing liquidity in them, clearing firms building new technology processes to consume compression output, and clearing firms building out the algorithm on their side. Ultimately this process will allow firms to more efficiently and accurately represent their open positions which will ultimately lead to regulatory capital efficiencies.

Exemplary Operating Environment

Aspects of at least some embodiments can be implemented with computer systems and computer networks that allow users to communicate trading information. An exemplary trading network environment for implementing trading systems and methods according to at least some embodiments is shown in FIG. 1. The implemented trading systems and methods can include systems and methods, such as are described herein, that facilitate trading and other activities associated with financial products based on currency pairs.

Computer system 100 can be operated by a financial product exchange and configured to perform operations of the exchange for, e.g., trading and otherwise processing various financial products. Financial products traded or otherwise processed by the exchange may include over-the-counter (OTC) products such as OTC forwards, OTC options, etc. Financial products of the exchange may also include, without limitation, futures contracts, options including options on futures contracts ("futures contract options"), index options, forex options, and/or other options such as those discussed above, and other types of derivative contracts.

Computer system 100 receives orders for financial products, matches orders to execute trades, transmits market data related to orders and trades to users, and performs other operations associated with a financial product exchange. Exchange computer system 100 may be implemented with one or more mainframe, desktop or other computers. In one embodiment, a computer device uses one or more 64-bit processors. A user database 102 includes information identifying traders and other users of exchange computer system 100. Data may include user names and passwords. An account data module 104 may process account information that may be used during trades. A match engine module 106 is included to match prices and other parameters of bid and offer orders. Match engine module 106 may be implemented with software that executes one or more algorithms for matching bids and offers.

A trade database 108 may be included to store information identifying trades and descriptions of trades. In particular, a trade database may store information identifying the time that a trade took place and a price associated with the trade (e.g., a bid price, an ask price, etc.). An order book module 110 may be included to store prices and other data for bid and offer orders, and/or to compute (or otherwise determine) current bid and offer prices. A market data module 112 may be included to collect market data, e.g., data regarding current bids and offers for exchange traded derivatives, futures contracts, options (e.g., options on futures contracts, index options, forex options, and/or other options such as those discussed above), FX forwards, and other OTC or derivative products. Module 112 may also prepare the collected market data for transmission to users. A risk management module 134 may be included to compute and determine a user's risk utilization in relation to the user's defined risk thresholds. An order processor module 136 may be included to decompose delta based and bulk order types for further processing by order book module 110 and match engine module 106.

A clearinghouse module 140 may be included as part of exchange computer system 100 and configured to carry out clearinghouse operations. Module 140 may receive data from and/or transmit data to trade database 108 and/or other modules of computer system 100 regarding trades of exchange traded derivatives, OTC FX forwards, futures contracts, futures contracts options, OTC options and contracts, and other financial products. Clearinghouse module 140 may facilitate the financial product exchange acting as one of the parties to every traded contract or other product. For example, computer system 100 may match an offer by party A to sell a financial product with a bid by party B to purchase a like financial product. Module 140 may then create a financial product between party A and the exchange and an offsetting second financial product between the exchange and party B. As another example, module 140 may maintain margin data with regard to clearing members and/or trading customers. As part of such margin-related operations, module 140 may store and maintain data regarding the values of various contracts and other instruments, determine mark-to-market and final settlement amounts, confirm receipt and/or payment of amounts due from margin accounts, confirm satisfaction of final settlement obligations (physical or cash), etc. As discussed in further detail below, module 140 may determine values for performance bonds associated with trading in products based on various types of currency pairs.

Each of modules 102 through 140 could be separate software components executing within a single computer, separate hardware components (e.g., dedicated hardware devices) in a single computer, separate computers in a networked computer system, or any combination thereof (e.g., different computers in a networked system may execute software modules corresponding more than one of modules 102-140).

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may implement one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics, radio links or other media.

A wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet. Computers 116, 118 and 120 may communicate with each other via the Internet 126 and/or LAN 124.

One or more market makers 130 may maintain a market by providing constant bid and offer prices for a derivative or security to exchange computer system 100. Exchange computer system 100 may also include trade engine 138. Trade engine 138 may, e.g., receive incoming communications from various channel partners and route those communications to one or more other modules of exchange computer system 100.

One skilled in the art will appreciate that numerous additional computers and systems may be coupled to exchange computer system 100. Such computers and systems may include, without limitation, additional clearing systems (e.g., computer systems of clearing member firms), regulatory systems and fee systems.

The operations of computer devices and systems shown in FIG. 1 may be controlled by computer-executable instructions stored on non-transitory computer-readable media. For example, computer device 116 may include computer-executable instructions for receiving market data from exchange computer system 100 and displaying that information to a user. As another example, clearinghouse module 140 and/or other modules of exchange computer system 100 may include computer-executable instructions for performing operations associated with determining performance bond contributions associated with holdings in products that are based on various types of currency pairs.

Of course, numerous additional servers, computers, handheld devices, personal digital assistants, telephones, and other devices may also be connected to exchange computer system 100. Moreover, one skilled in the art will appreciate that the topology shown in FIG. 1 is merely an example and that the components shown in FIG. 1 may be connected by numerous alternative topologies.

Illustrative Embodiments

In some cases, the clearinghouse module 140 may be configured to monitor and/or otherwise manage a capital obligation associated with a plurality of exchange traded derivatives, such as an exchange traded derivatives portfolio. In at least some embodiments, the exchange computer system 100 (or "system 100") receives, stores, generates and/or otherwise and processes data. In accordance with various aspects of the invention, a clearinghouse (e.g., the clearinghouse module 140) may act as a guarantor of the agreement for the derivative. As discussed above, a financial product (e.g., an exchange traded derivatives product) may be cleared and guaranteed by the clearinghouse. This may promise more interesting capital efficiencies to allow institutions to reduce a capital charge associated with a plurality of exchange traded derivatives, such as by reducing a gross notional and/or reducing line items associated with the plurality of exchange traded derivatives.

Figure 2:
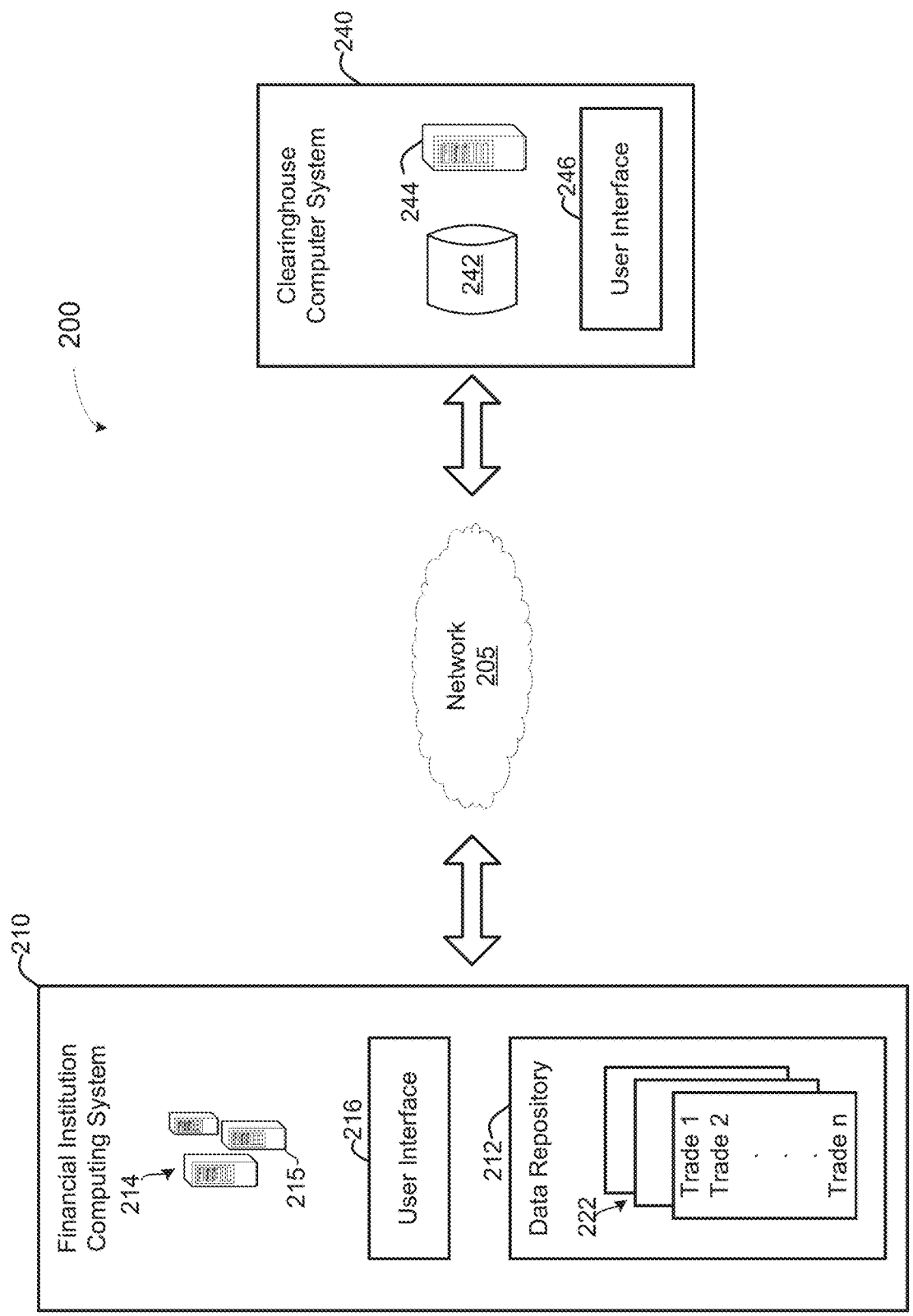
FIG. 2 shows a portion of an illustrative system for blending notional values associated with a plurality of exchange traded derivatives according to at least some embodiments.

FIG. 2 shows a portion of an illustrative system 200 for blending a plurality of exchange traded derivatives according to at least some embodiments. In some cases, the illustrative system 200 may include a financial institution computing system 210 communicatively coupled to a clearinghouse computer system 240 via a network 205 (e.g., a wide area network (WAN), the LAN 124, the Internet 126, etc.). The financial institution computing system 210 may include a data repository 212, one or more computing devices 214, and, in some cases, at least one user interface 216. In some cases, the data repository 212 may store information about one or more portfolios 222 including a plurality of exchange traded derivatives, where the portfolios 222 may include information about two or more different exchange traded derivatives (e.g., trade 1, trade 2, trade n, etc.). For example, the exchange traded derivatives information may include a fixed rate value, a floating rate value, a notional value, and/or a cash value for each of the plurality of different trades of the portfolios 222. In another illustrative example, the exchange traded derivatives information may include any number of risk factors (e.g., a currency pair, an exchange rate value, a notional amount, and/or a buy or sell position, etc.) associated with each currency of the currency pair for each of the plurality of different exchange traded derivatives portfolios 222. In some cases, the portfolios 222 may be associated with the financial institution, and/or one or more different customers of the financial institution. For example, a financial entity and/or a customer of the financial entity may desire to enter into one or more different exchange traded derivatives to hedge financial risk due to an exchange rate associated with a currency. In some cases, a computing device 215 and/or the user interface 216 may be used to facilitate user access to the one or more of the portfolios 222. For example, a user may log into the financial institution computing system 210 via one or more user interface screens accessible via the user interface 216. In some cases, the user interface 216 is at a geographical location local to the financial institution computer system 210 and/or at a geographical location of the user.

In some cases, the clearinghouse computer system 240 may include one or more of a data repository 242, a computer device 244 and/or a user interface 246. The clearinghouse computer system 240 may be communicatively coupled to at least one financial institution computer system, such as the financial institution computing system 210 via the network 205. In some cases, the clearinghouse computer system 240 may be configured to obtain information about one or more of the portfolios 222, process the information to blend notional amounts associated with the different exchange traded derivatives held in the portfolios 222 and communicate information about the blended exchange traded derivatives to the financial institution computing system 210 to reduce one or more line items associated with the portfolios 222 and/or to reduce a gross notional value associated with the portfolios 222 to reduce a total capital charge incurred by the financial institution in relation to the portfolios 222.

FIGS. 3-5 show representative spreadsheet corresponding to algorithms for compressing illustrative portfolios. In an example, a notional of a generated exchange traded derivative may be determined based on the open interest and notional values of each exchanged traded derivative held in the portfolio using the formula where the subscripts denote the contract month:

Cycle #1: NewContractGrossNotional$_1$=Min(Contract$_1$(OpenInterest$_1$*Notional$_1$), Contract$_2$(OpenInterest$_2$*Notional$_2$), . . . Contract$_{22}$(OpenInterest$_{22}$*Notional$_{22}$))

Cycle #2: NewContractGrossNotional$_2$=Min((Contract$_1$(OpenInterest$_1$*Notional$_1$)−NewContractGrossNotional$_1$), (Contract$_2$(OpenInterest$_2$*Notional$_2$)−NewContractGrossNotional$_1$), . . . (Contract$_{21}$(OpenInterest$_{21}$*Notional$_{21}$)−NewContractGrossNotional$_1$))

Cycle then repeats until the first month is the only contract month remaining, while remainder amounts drop to the end total gross notional in the new contract due to their optimization ineligibility.

In optimizing the positions held in a portfolio, the holdings may be consolidated based on the holdings in a consecutive month. In the illustrative example of FIG. 3, the firm may have 100 open interest in consecutive months, representing an opportunity to compress the positions into a single lot of 100, rather than 22 individual iterations of the 100 lots. Without optimization, the margining process may require 22 times as much capital than would be necessary. Based on the algorithms described in the figures, these positions may be compressed into a single holding (e.g., a 100 position holding) for the firm as a new contract, more akin to the way OTC swaps are constructed and thus obtain significant capital and operational efficiencies. This process is then repeated, deriving the most optimal set of positions possible for the firm. In cases, where lots are smaller than a specified number (e.g., a 100 position holding), these smaller holdings (e.g., a 50 position holding) may be passed on in the optimization process and may be continued to be held in the portfolio as a holding of that specific lot size. In an example, the optimization process may include a number of iterations to consolidate a portfolio based on a specified lot size that may differ for each iteration. To determine a final size of the compressed portfolio, the compressed lot size of each iteration may be summed with any remaining smaller lot size added to the total. As can be seen in the illustrative example of FIG. 3, the optimization cycle includes 9 iterations, where a portion of the positions held in the portfolio are compressed each cycle, so that a portfolio with an initial open interest of 4200 has been compressed to a portfolio having an open interest of 350 resulting in a significantly smaller portfolio by reducing the size of the portfolio over 90%.

In the illustrative example shown in FIG. 4, the optimization cycle may be calculated using a number of factors including the longest dated open interest and a maximum of open interest. As shown in FIG. 4, the maximum outstanding open interest may be identified by a computing device. The existing open interest may be replaced with a contract that includes a 'maximum outstanding open interest' that is paired with a fraction schedule across the months of open interest. This process is akin to creating a variable notional swap, whereby there is a single maximum notional reference amount (which is used to derive regulatory capital requirements) and then fractions attributable to each individual month for which the contract exists.

New Contract Gross Notional=Max(Contract1(OpenInterest1*Notional1), Contract$_2$(OpenInterest$_2$*Notional$_2$), . . . Contract$_{22}$(OpenInterest$_{22}$*Notional$_{22}$))

Notional Frequency Contract Month$_1$=Contract$_1$(OpenInterest$_1$*Notional$_1$)/New Contract Gross Notional Notional Frequency Contract Month$_2$=Contract$_2$(OpenInterest$_2$*Notional$_2$)/New Contract Gross Notional Notional Frequency Contract Month$_{22}$=Contract$_{22}$(OpenInterest$_{22}$*Notional$_{22}$)/New Contract Gross Notional FIG. 5 shows an illustrative optimization algorithm modeled after a "calendar spread" trading strategy. The algorithm may take the calendar spread and reduce it into a single new position representative of the identical risk, but without the burdensome double count of gross notional outstanding. This will provide the clearing firms capital and operational efficiencies by allowing them to represent the positions as a single set of risk exposures.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims.

We claim:

1. A computing system comprising a processor configured to:
   determine that a data storage size of a portfolio stored in a non-transitory memory coupled with the processor, the portfolio comprising data indicative of derivative positions, is approaching a threshold; and iteratively perform, until a predetermined criterion has been reached, a plurality of optimization cycles to compress the portfolio, each including:

partition the portfolio into a plurality of blocks by grouping positions within the portfolio that are present in consecutive contracts for a given product having consecutive maturity dates, each position being characterized by a notional value in common with another associated position; and for each block of the plurality of blocks:

calculate which of the consecutive contracts has a largest number of unsettled positions; and transform the positions of the consecutive contracts into a new single position in a new product, the new single position including a calculated largest number of unsettled positions paired with a fraction schedule across the consecutive maturity dates of the calculated largest number of unsettled positions, wherein a data storage requirement for the new single position is smaller in size than a data storage requirement for the positions of the consecutive contracts from which the new single position was transformed, the data storage size of the portfolio reduced thereby while still representative of the portfolio including the positions of the consecutive contracts from which the new single position was transformed.

2. The computing system of claim 1, wherein the grouped positions of each of the blocks may be traded between two counterparties.

3. The computing system of claim 1, wherein each of the consecutive contracts comprises a futures contract or an options contract.

4. The computing system of claim 1, wherein each of the plurality of optimization cycles reduces the number of unsettled positions of each contract of the consecutive contracts by a value common to a quantity field and wherein a total number of contracts in the consecutive contracts is reduced.

5. The computing system of claim 1, wherein the predetermined criterion is met when no further compression is possible.

6. The computing system of claim 1, wherein a result of each of the plurality of optimization cycles comprises a tradeable contract having a date corresponding to a delivery date of the tradeable contract and the number of unsettled positions associated with that delivery date.

7. The computing system of claim 1, wherein a result of each of the plurality of optimization cycles correspond to a compressed representation of the portfolio having a reduced notional value, wherein the original contracts of the portfolio that comprise each of the positions in the consecutive contracts exist and wherein the compressed representation of the portfolio is used to calculate a reduced capital requirement.

8. The computing system of claim 1, wherein, upon the determination that the data storage size of the portfolio is approaching the threshold, the processor notifies a user and awaits receipt of a command to proceed with the optimization cycle.

9. The computing system of claim 1, wherein the portfolio is characterized by a value based on the positions prior to the transformation, the portfolio being characterized by the same value subsequent to the transformation.

10. A computer implemented method comprising:

determining, by a processor, that a data storage size of a portfolio stored in a non-transitory memory coupled with the processor, the portfolio comprising data indicative of derivative positions is approaching a threshold; and iteratively performing, by the processor, until a predetermined criterion has been reached, a plurality of optimization cycles to compress the portfolio, each including:

partitioning, by the processor, the portfolio into a plurality of blocks by grouping positions within the portfolio that are present in consecutive contracts for a given product having consecutive maturity dates, each position being characterized by a notional value in common with another associated position; and for each block of the plurality of blocks:

calculating, by the processor, which of the consecutive contracts has a largest number of unsettled positions; and transforming, by the processor, the positions of the consecutive contracts into a new single position in a new product, the new single position including a calculated largest number of unsettled positions paired with a fraction schedule across the consecutive maturity dates of the calculated largest number of unsettled positions, wherein a data storage requirement for the new single position is smaller in size than a data storage requirement for the positions of the consecutive contracts from which the new single position was transformed, the data storage size of the portfolio reduced thereby while still representative of the portfolio including the positions of the consecutive contracts from which the new single position was transformed.

11. The computer implemented method of claim 10, wherein the grouped positions of each of the blocks may be traded between two counterparties.

12. The computer implemented method of claim 10, wherein each of the consecutive contracts comprise an options contract or a futures contract.

13. The computer implemented method of claim 10, wherein each of the plurality of optimization cycles reduces the number of unsettled positions of each contract of the consecutive contracts by a value common to a quantity field and wherein a total number of contracts in the consecutive contracts is reduced.

14. The computer implemented method of claim 10, wherein the predetermined criterion is met when no further compression is possible.

15. The computer implemented method of claim 10, wherein a result of each of the plurality of optimization cycles comprises a tradeable contract having a date corresponding to a delivery date of the tradeable contract and the number of unsettled positions associated with that delivery date.

16. The computer implemented method of claim 10, wherein a result of each of the plurality of optimization cycles correspond to a compressed representation of the portfolio having a reduced notional value, wherein the original contracts of the portfolio that comprise each of the positions in the consecutive contracts exist and wherein the compressed representation of the portfolio is used to calculate a reduced capital requirement.

17. The computer implemented method of claim 10, further comprising notifying, by the processor upon the determination that the data storage size of the portfolio is approaching the threshold, a user and awaiting receipt of a command to proceed with the optimization cycle.

18. The computer implemented method of claim 10, wherein the portfolio is characterized by a value based on the positions prior to the transforming, the portfolio being characterized by the same value subsequent to the transforming.

19. A computer system comprising:

means for determining that a data storage size of a portfolio stored in a non-transitory memory, the portfolio comprising data indicative of derivative positions is approaching a threshold; and means for iteratively performing, until a predetermined criterion has been reached, a plurality of optimization cycles to compress the portfolio, each including:

means for partitioning the portfolio into a plurality of blocks by grouping positions within the portfolio that are present in consecutive contracts for a given product having consecutive maturity dates, each position being characterized by a notional value in common with another associated position; and for each block of the plurality of blocks:

means for calculating which of the consecutive contracts has a largest number of unsettled positions; and means for transforming the positions of the consecutive contracts into a new single position in a new product, the new single position including a calculated largest number of unsettled positions paired with a fraction schedule across the consecutive maturity dates of the calculated largest number of unsettled positions, wherein a data storage requirement for the new single position is smaller in size than a data storage requirement for the positions of the consecutive contracts from which the new single position was transformed, the data storage size of the portfolio reduced thereby while still representative of the portfolio including the positions of the consecutive contracts from which the new single position was transformed.

20. The computer system of claim 19, wherein the predetermined criterion is met when no further compression is possible.

* * * * *